Oct. 16, 1962     E. A. STALKER     3,058,202
METHOD OF MAKING HOLLOW BLADES FOR COMPRESSORS, TURBINES, AND
THE LIKE
Filed June 27, 1958     4 Sheets-Sheet 1

*INVENTOR.*
EDWARD A. STALKER
BY *Marshal, Biebel, Frencley Bugg*
ATTORNEYS

INVENTOR.
EDWARD A. STALKER
BY Marechal, Biebel, French & Bugg
ATTORNEYS

Oct. 16, 1962  E. A. STALKER  3,058,202
METHOD OF MAKING HOLLOW BLADES FOR COMPRESSORS, TURBINES, AND
THE LIKE
Filed June 27, 1958  4 Sheets-Sheet 3

*INVENTOR.*
EDWARD A. STALKER
BY *Marechal, Biebel, French & Bugg*
ATTORNEYS

United States Patent Office 3,058,202
Patented Oct. 16, 1962

3,058,202
METHOD OF MAKING HOLLOW BLADES FOR COMPRESSORS, TURBINES, AND THE LIKE
Edward A. Stalker, Bay City, Mich. (% Stalker Development Co., 903 Woodside Ave., Essexville, Mich.)
Filed June 27, 1958, Ser. No. 745,050
8 Claims. (Cl. 29—156.8)

This invention relates to the making of hollow blades for compressors, turbines and the like.

An object of my invention is to provide a method of making hollow blades having a thickened root portion and a thinner blade portion whose walls are free of internal stress.

Another object is to provide a method of making a hollow blade by subjecting a blade shell to spanwise compression in order to complete the final airfoil shape and leaving the blade walls free of internal stress.

Other objects will appear from the specification, appended claims, and accompanying drawings.

It is desirable that replaceable hollow blades have their bases integral with the walls of the blade shells. Yet this is a very difficult structure to provide where the base is not perpendicular to the spanwise extent of the blade and/or where internal stresses are to be excluded from the material.

The present invention provides a means of making a hollow blade with an integral base set askew to the spanwise extent of the blade as well as a hollow blade free of internal stress having an integral blade base.

The blade blank is formed with the selected distribution of thickness along its spanwise extent including a thickened root portion preferably fairing integrally into the adjacent shell portion by a fillet. The root portion of the blank is substantially at right angles to the blade span but may subsequently be formed to a different angle to the span.

The blank is next formed to the precise chordwise contours from closely to the leading edge to the trailing edge portion of the blank. The blank is then folded to form the leading edge by bringing the opposite or trailing edges together or to their selected position relative to each other to form a blade shell or element. The leading edge may be curved and the blade may be twisted along the span with varying airfoil sections or contours therealong.

Preferably the next step is to insert a mandrel inside the blank and to place the blank within an accurately formed cavity of a die means. The contours of the cavity should correspond to the predetermined contours for the blade. Then the root end of the blade is upset to form the base part of the blade, preferably to its precise final or predetermined shape. The final or predetermined contours of the blade are imparted to the shell while pressure is applied compressing the material preferably spanwise and preferably substantially beyond the yield stress of the material. The upsetting operation on the root end of the blade element may be done either hot or cold and before the trailing edge portions are bonded together, particularly if brazing is the bonding means employed.

The above objects are accomplished by the means illustrated in the accompanying drawings in which—

Figure 1:
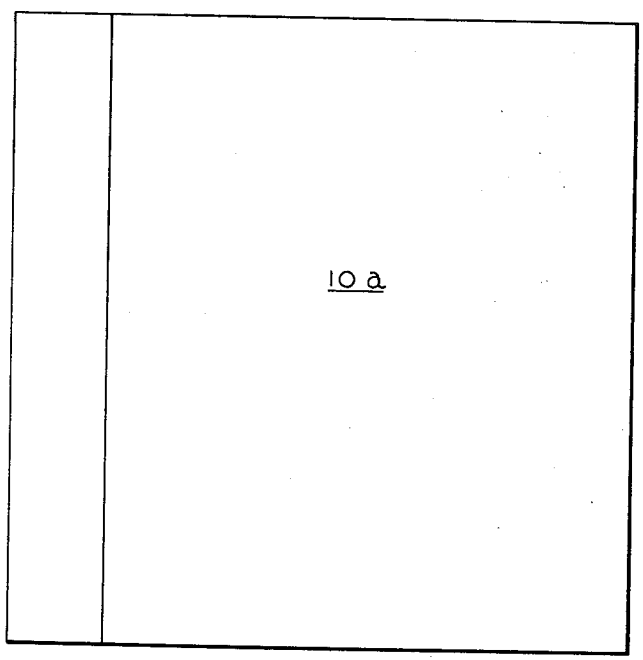
FIG. 1 is a plan view of a blade blank before forming to chordwise contours.
Figure 2:
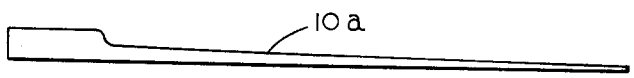
FIG. 2 is an edge view of the blank of FIG. 1.

Referring now to the drawings, a blade blank 10a is shown in FIGS. 1 and 2. It has a thickened portion at its root end tapering to a relatively thin end which becomes the tip end of the blade. The blank is preferably a unitary piece of sheet metal providing the side walls of the blade and may be suitably formed by pressing or rolling a length or strip of metal.

Figure 3:
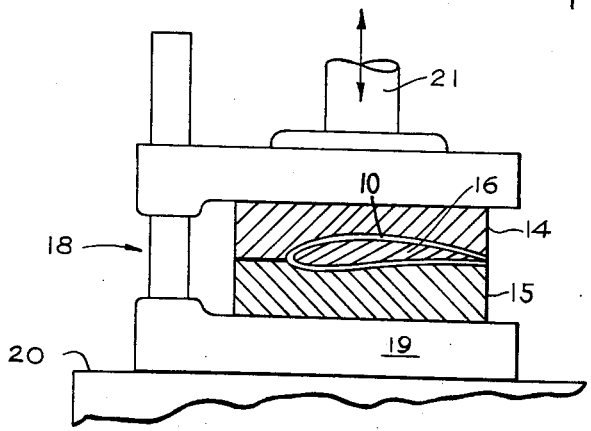
FIG. 3 is a fragmentary view of the blade blank between dies operably secured in a press.

The blade blank is first folded to form a leading edge by bringing the opposite or trailing edges together relative to each other to form a blade shell or element 10. The element is then formed between dies 14 and 15 (FIG. 3) with a mandrel 16 inside the folded blank, to elongated cross sections closely similar to the predetermined contours, thus producing a blade-like element or shell. The blank at this stage is a tubular element preferably with free or open trailing edges extending along an edge corresponding to a spanwise edge of the blade. The dies are guided in operable relation by the die set 18 whose base 19 is fixed to the bed of a press 20. The upper die 14 is fixed to the movable ram 21 of the press. The trailing edges are closely adjacent each other or in substantially faying relation with each other or any material to be secured to or between them.

Figure 7:
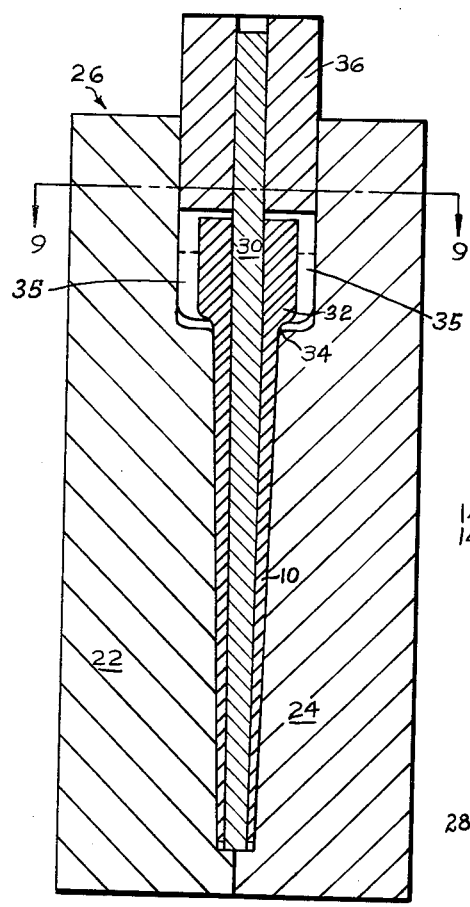
FIG. 7 is a section through a set of dies on line 7—7 of FIG. 8.
Figure 8:
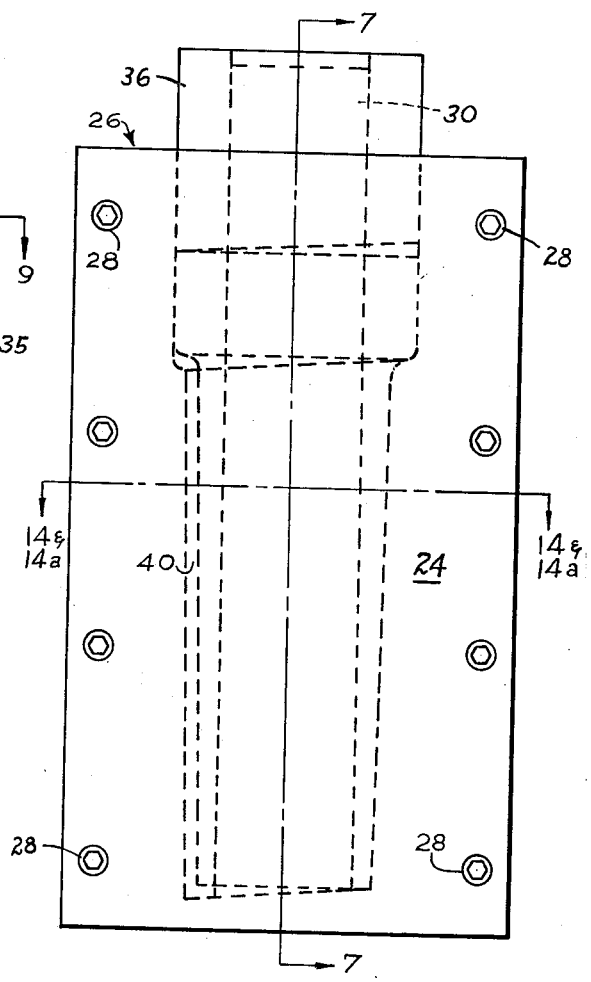
FIG. 8 is a plan view with the blade blank in place of a set of dies for forming the blank to predetermined final contours.
Figure 4:
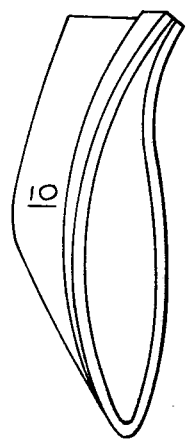
FIG. 4 is an end view of a folded blade blank formed to chordwise contours approximating the final contours desired.
Figure 6:
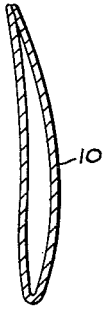
FIG. 6 is a section on line 6—6 of FIG. 5.
Figure 5:
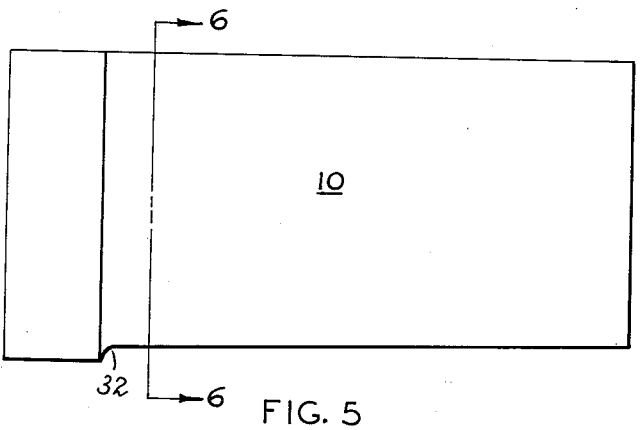
FIG. 5 is a plan view of the folded blade blank from the dies of FIG. 3.
Figure 13:
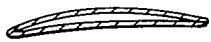
FIG. 13 is a section on line 13—13 of FIG. 11.

The formed blade blank 10 is placed between the sections 22 and 24 of the die means 26, FIGS. 7 and 8, which are secured together by the machine screws 28 or other suitable means. A mandrel 30 is inserted in the blank either before or after it is positioned in the die means.

As shown in FIGS. 7 and 8 the fillet 32 of the blade blank seats on the shoulders 34 of the die parts and there is clearance 35 between the sides of the root portion of the blank and the sides of the die cavity. The hammer 36 has a sliding fit with the mandrel and the sides of the die cavity so that it may be moved up and down to upset the root portion of the blank and fill the die cavity.

As shown particularly in FIG. 8 the shoulders of the die parts are set at an angle to the folded edge of the blade. Also the wall at the lower end of the die cavity is preferably set at a similar angle. The effect of the hammer 36 is to force the fillet portion of the root portion against the shoulders throughout their chordwise length and preferably the up end of the blade against the lower wall of the die means.

As the hammer 36 is pressed or struck against the end of the blade, the root portion is upset to fill space 35 at the upper end of the die cavity. At the same time a compressive force is applied by the upsetting operation to the side portions of the blade in the spanwise direction which is greater than the yield stress or elastic limit of the material. Chordwise expansion of the material occurs, filling the clearance space 40, and thus resulting in the accurate shaping of the side wall portions of the blade to the predetermined contours of the dies. FIGS. 10–13 show the resulting shape of the blade resulting from the compressing and die action on the blank.

Figure 14B:
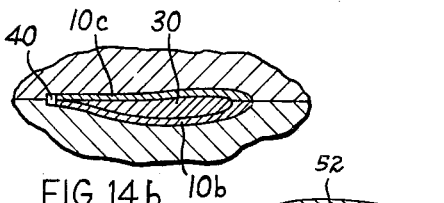
FIG. 14b is a further section similar to FIG. 14 showing another form of blade shell utilizing two separate blade walls.
Figure 14:
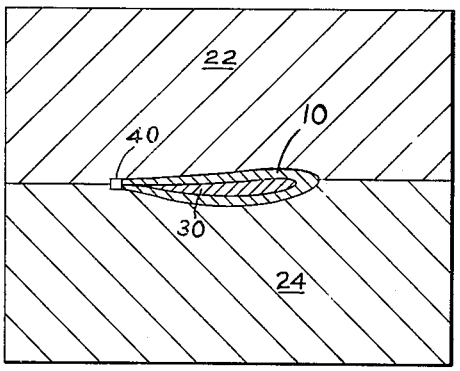
FIG. 14 is a section on line 14—14 of FIG. 8.

As shown in FIG. 14 the trailing edge portions of the upper and lower walls are free under the hammer action to deform into the spanwise clearance space 40 along the trailing edge. It is important that this space exists under the compressing action of the hammer so that when the blade base is finally formed the blade shell has the blade contours which have been preselected and built into the die means and the material will be free of internal stresses which tend to cause warping or distortion when the blade is heated to brazing or use temperatures. The compressing of the material in a spanwise direction with freedom of extension at right angles to the action will result in such freedom of internal stresses.

Figure 15:
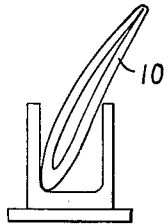
FIG. 15 shows a blade loosely supported in a fixture for brazing.

With the material free of internal stresses it may be bonded by high temperature brazing without distortion and free of any contour constraining fixtures extending along either the chord or the span of the blade. Thus the blade may be supported loosely in a fixture such as shown in FIG. 15 during the brazing operation. In some uses the blade edges are left free or spaced apart and the blade is used in this condition, for instance to emit a flow of fluid such as cooling fluid.

The blade blank is removed from the die means and its trailing edge portions are secured together, being preferably bonded by brazing in a muffle having a controlled atmosphere and a substantially uniform temperature. After the bonding step any excess material at the trailing edge of the blank may be cut off. Preferably the root end of the blade has a rectangular-like shape corresponding to the die cavity for the base and is next machined to have the precise detail shown in FIGS. 10–12. If a more expensive die is warranted by the volume of production the die could provide the precise details of the base.

Figure 14A:
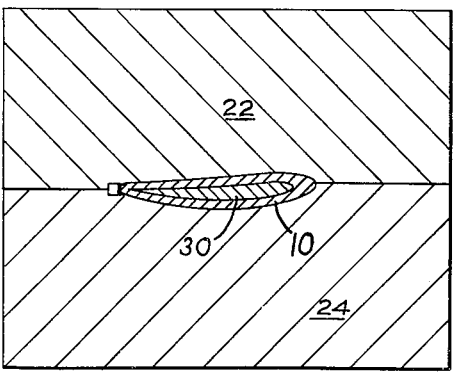
FIG. 14a is a section similar to FIG. 14 showing an alternate form of blade shell utilizing a flattened tube.

The blank from which the blade is to be formed is preferably a sheet of metal but a tube of closed cross sectional circumference may also be used particularly if a joint along an edge is objectionable in certain uses. FIG. 14a shows such a tubular element in cross section in the dies 22 and 24.

FIG. 14b shows a modified construction of blade shell utilizing two separate pieces 10b and 10c to form the tubular element having upper and lower blade walls respectively. In this case both leading and trailing edges are secured together as by brazing to form the hollow tubelike blade element.

The blade made by the process can be bonded to supporting parts with assurance that the joints will not be spoiled by the blade deforming away from the parts.

Figure 17:
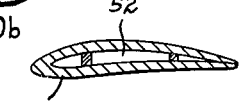
FIG. 17 is a section on line 17—17 of FIG. 16.
Figure 16:
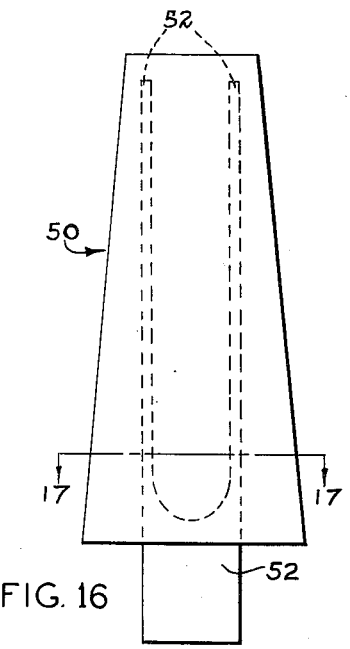
FIG. 16 is a side elevation of an alternate form of blade according to the subject invention.

FIGS. 16 and 17 show a finished blade 50 with a supporting part, namely a beam means 52 bonded to its internal surfaces. The shell of the blade is free of internal stresses and the beam means is also substantially stable under wide temperature variations. The two are bonded together by brazing. Since the shell is stable it will not distort away from the beam means but will continue within brazing clearance relative to the inside surfaces of the shell so that it can be bonded thereto.

Figure 18:
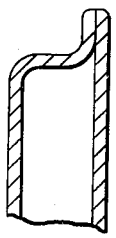
FIG. 18 is an enlarged section on line 18—18 of FIG. 11.
Figure 11:
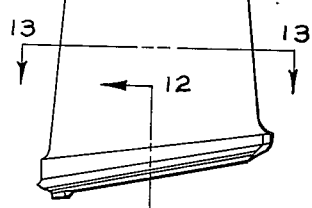
FIG. 11 is a plan view of the blade formed in the dies of FIG. 7.
Figure 12:
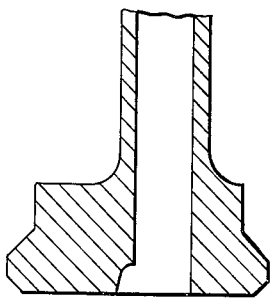
FIG. 12 is an enlarged fragmentary section of the blade on line 12—12 of FIG. 11.
Figure 10:
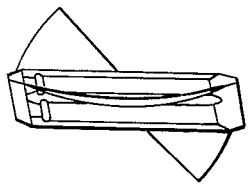
FIG. 10 is a bottom view of the base in FIG. 11.
Figure 9:
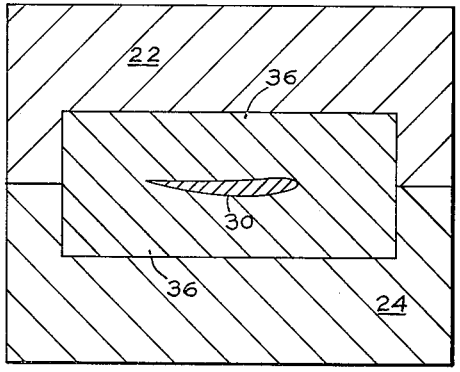
FIG. 9 is a section on line 9—9 of FIG. 7.

Preferably the tip of the blade is closed as shown in FIG. 18.

It will now be clear that there has been provided a novel and useful means and method for forming hollow blades with an integral base, for forming a blade precisely to preselected contours with stress free internal conditions of the material so that the blade can be heated to high temperatures while retaining precisely its predetermined contours.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A process of fabricating a hollow blade of preselected contours for compressors, turbines and the like substantially free of internal stress tending to cause deformation under temperatures of the order of brazing or use temperatures, comprising the steps of forming a unitary piece of metal having a thickened root portion integral with a thinner blade portion into the shape of a tubular blade element having elongated cross sections of airfoil shape and having open spanwise edges, and operating on said element by compressing it spanwise in a die to form the blade portions thereof into said preselected contours and simultaneous to upset said root portion into the shape of a blade base while providing for the unrestrained movement of said open edges in the chordwise sense.

2. A process of fabricating a hollow blade of predetermined contours for compressors, turbines, and the like substantially free of internal stress tending to cause deformation under temperatures of the order of brazing or use temperatures, comprising the steps of forming a unitary piece of sheet metal into a blade element having elongated cross sections of airfoil shape and having open spanwise edges, and operating on said element by compressing it in a spanwise direction in a die to form the side portions thereof precisely into said predetermined contours while providing for the unrestrained movement of said open edges in the chordwise sense.

3. A process of fabricating a hollow blade of predetermined contours for compressors, turbines, and the like substantially free of internal stress tending to cause deformation under temperatures of the order of brazing or use temperatures, comprising the steps of forming a unitary piece of sheet metal into a blade element having elongated upper and lower blade walls of airfoil shape terminating in open spanwise trailing edges, placing said element in a die of predetermined contour with said edges unrestrained to chordwise movement, operating on said element by compressing it spanwise in said die to effect chordwise flow of the material forming said blade walls precisely into said predetermined contours, said spanwise compression and chordwise flow relieving said blade walls of internal stress from said forming thereof to said predetermined contours, and securing said trailing edges together by fused metal.

4. A process of fabricating a hollow blade of predetermined airfoil contours for compressors, turbines, and the like substantially free of internal stress tending to cause deformation under temperatures of the order of brazing or use temperatures comprising the steps of forming a unitary piece of sheet metal into a hollow blade shaped element having elongated cross sections of airfoil shape, and having spanwise edges, operating on said element by compressing it spanwise in a die of predetermined contour with an internal mandrel, and permitting unrestrained chordwise extension of the metal between said die and said mandrel with resultant forming of the blade precisely into said predetermined contours.

5. A process of fabricating a hollow blade of predetermined airfoil contours for compressors, turbines, and the like substantially free of internal stress tending to cause deformation under temperatures of the order of brazing or use temperatures comprising the steps of forming a unitary piece of sheet metal into a blade-like element having elongated cross sections of airfoil shape having substantially free edges along one side of said element corresponding to a spanwise edge of the blade, forming the side portions of the blade precisely into said predetermined contours, compressing said element spanwise while retaining said predetermined contours to substantially eliminate internal stress in said material of said element induced therein during said forming and resulting in chordwise flow of said metal and securing the edge portions of said blade together.

6. A process of fabricating a hollow blade of predetermined contours for compressors, turbines, and the like substantially free of internal stress tending to cause deformation under temperatures of the order of brazing or use temperatures, comprising the steps of compressing in the spanwise direction a blade shell of metal having open spanwise edges beyond the yield stress of the metal with resultant chordwise flow of the material to form said shell to predetermined contours, said shell in the formed condition having substantially free edge portions extending along the direction of the compressing action, and securing said edge portions together.

7. A process of fabricating a hollow blade of predetermined contours for compressors, turbines, and the like substantially free of internal stress tending to cause deformation under temperatures of the order of brazing or use temperatures, comprising the steps of forming a tubular piece of metal into substantially said predetermined contours forming a blade shell having open spanwise edges, and compressing said blade shell spanwise beyond the yield stress of the metal thereof to effect the formation thereof precisely to said predetermined contours while providing for the unrestrained movement of said open edges in the chordwise sense.

8. A process of fabricating a hollow blade of predetermined contours for compressors, turbines, and the like substantially free of internal stress tending to cause deformation under temperatures of the order of brazing or use temperatures, comprising the steps of forming two pieces of sheet metal into approximately the shape of the upper and lower walls of said blade and to the approximate contours thereof forming a blade shell having open spanwise edges, compressing said blade shell spanwise beyond the yield stress thereof to effect the formation thereof precisely to said predetermined contours, and securing the respective edges of said metal sheets together along the leading and trailing edge portions of the two blade sheets to form the completed blade.

References Cited in the file of this patent

UNITED STATES PATENTS

| | | |
|---|---|---|
| 983,849 | Wales | Feb. 7, 1911 |
| 1,613,595 | Abel | Jan. 11, 1927 |
| 1,980,834 | Squires | Nov. 13, 1934 |
| 2,196,497 | Heman | Apr. 9, 1940 |
| 2,238,212 | Cornell | Apr. 15, 1941 |
| 2,722,047 | Cousino | Nov. 1, 1955 |
| 2,787,828 | Cousino | Apr. 9, 1957 |
| 2,849,788 | Creek | Sept. 2, 1958 |

FOREIGN PATENTS

| | | |
|---|---|---|
| 619,107 | Great Britain | Mar. 3, 1949 |
| 716,735 | Great Britain | Oct. 13, 1954 |
| 757,502 | Great Britain | Sept. 19, 1956 |